United States Patent [19]

Ashikawa

[11] Patent Number: 4,526,796
[45] Date of Patent: Jul. 2, 1985

[54] HEAT-TREATED TEA AND METHOD FOR PREPARING THE SAME

[76] Inventor: Keitaro Ashikawa, 408, Ishikawa, Numazu-shi, Shizuoka-ken, Japan

[21] Appl. No.: 477,137

[22] Filed: Mar. 21, 1983

[30] Foreign Application Priority Data

Mar. 29, 1982 [JP] Japan .................................. 57-48838

[51] Int. Cl.³ .......................... A23B 4/04; F26B 11/02
[52] U.S. Cl. ...................................... 426/465; 34/133; 426/640
[58] Field of Search ........................ 426/465, 443, 640; 34/120, 133

[56] References Cited

U.S. PATENT DOCUMENTS 4,203,358  5/1980  Vogt ...................................... 34/133

FOREIGN PATENT DOCUMENTS 50-155054  11/1975  Japan .
52-68499   5/1977   Japan .
762787     12/1956  United Kingdom ................ 426/465

OTHER PUBLICATIONS

"The Green Tea"; Shizuoka Tea Growing Ind. Assoc., 1970-10, vol. 23, No. 10, pp. 52-55, (Oct. 1, 1970).

Primary Examiner—George Yeung
Attorney, Agent, or Firm—Frishauf, Holtz, Goodman & Woodward

[57] ABSTRACT

The present invention provides a novel heat-treated tea. The heat-treated tea is obtained by placing green tea leaves in a tea drier, supplying the drier with dry air heated externally to 200° to 300° C. and heating the drier from outside to heat the tea leaves to 200° to 300° C. for 20 to 60 minutes. The tea obtained is brown in color and can be served by brewing in hot water as is done with the traditional green or roasted tea. It has special flavor and aroma different from the traditional teas. The extract of said heat-treated tea is effective in disinfection or preventing hung-over or stiff shoulder. Additional of said extract to wheat flour for making noodles and breads will improve the taste and quality of the product.

7 Claims, 2 Drawing Figures

HEAT-TREATED TEA AND METHOD FOR PREPARING THE SAME

BACKGROUND OF THE INVENTION

The present invention relates to a novel heat-treated tea and a method for preparing the same.

Various types of tea such as green tea, roasted tea, black tea, Oolong tea, etc. are widely enjoyed not only for their taste but also for their sedative and diuretic effects. Recent studies revealed that green tea contains an ingredient which suppresses mutation of cells, and its effect in preventing cancers and aging process is anticipated.

The present invention aims to provide a novel heat-treated tea which contains a large amount of pharmacologically useful substances and yet maintains its taste and a method for preparing the same.

BRIEF DESCRIPTION OF THE DRAWINGS

The attached drawings illustrate a tea drier suitable for preparing the heat-treated tea according to the present invention, wherein.

DETAILED DESCRIPTION OF THE INVENTION

Figure 1:
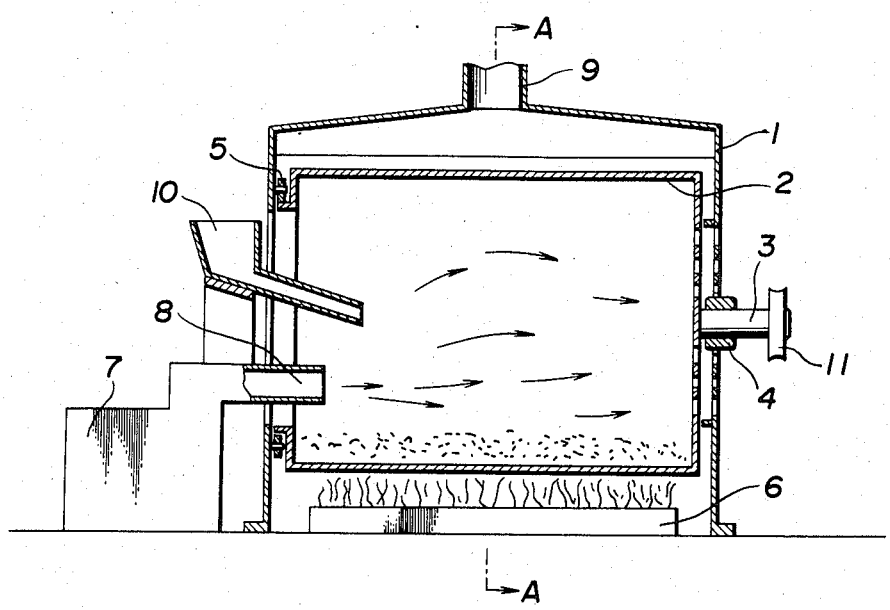
FIG. 1 shows a sectional view of said tea drier and FIG. 2 shows a sectional view of FIG. 1 along A—A.
Figure 2:
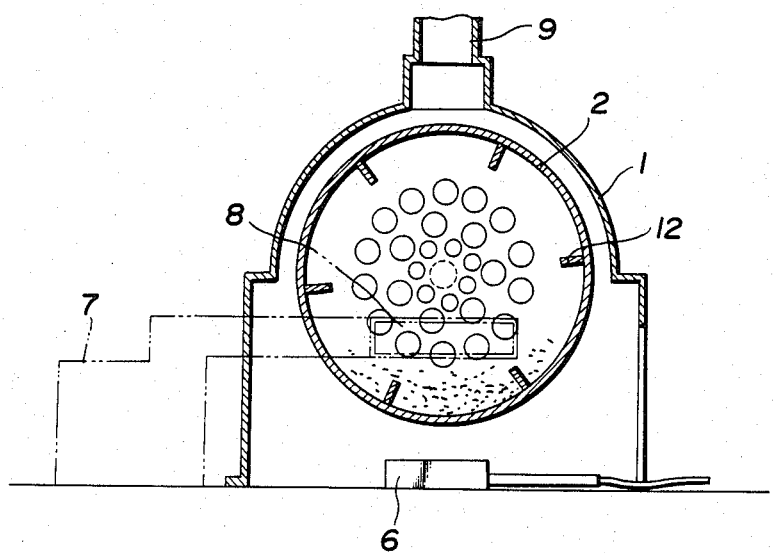

The present invention relates to a heat-treated tea and a method for preparing the same comprising the steps of placing green tea leaves in a tea drier, supplying the tea drier with dry air heated outside the drier to a temperature between 200° to 300° C. and concurrently heating the drier from outside to heat the tea leave to a temperature between 200° and 300° C. for 20 to 60 minutes.

The present invention further relates to a method for preparing the heat-treated tea wherein said drier comprises a rotary drum supported on a journal inside said drier, a heating device provided below said rotary drum to heat the same and a hot air inlet port for supplying hot air into the rotary drum from an external hot air supplying device.

The present invention further relates to a method for preparing the heat-treated tea wherein the temperature of said dry air is 250° C. and the heating temperature of the drier is 300° C.

Green tea leaves to be used as the raw material in the present invention method are not limited to any particular kind, but any conventionally processed tea can be used. That is, green tea leaves are used which have been steamed, rubbed several times, dried and then heated. Green tea leaves are dried and heated at a temperature below 110° C., usually between 80° and 100° C., to prevent discoloring. According to the present invention, it is possible to use so-called "crude" tea which is not roasted.

The heat-treated tea according to the present invention is produced by placing said green tea leaves in the tea drier and heating the same from outside to a temperature between 200° and 300° C. for 20 to 60 minutes. The temperature and the time for heating are critical in the method and should be carefully controlled. Excessive heating impairs flavor and aroma and inhibits useful chemical changes of the ingredients.

It is also essential in the present method to heat the tea leaves by blowing dry air heated to 200° to 300° C. Blowing of the heated air is effective in that it dries the tea leaves thoroughly and promotes useful chemical changes of the ingredients as it supplies oxygen.

In the present method, it is important that the heating by means of the drier and by means of dry hot air must be conducted at the same time; heating by either one of them alone would not achieve satisfactory result. The following drier has been proposed as suitable for such heating in two different directions.

It is preferable to use a tea drier which comprises a rotary drum journaled to the body of the drier, a heating device provided below said rotary drum for heating said rotary drum, and an air outlet port for blowing in the externally heated air.

The structure of the drier will now be described referring to the drawings. The reference numeral 1 denotes the main body of a tea drier, 2 a rotary drum which is cylindrical in shape and has one open end and another end provided with a steel plate. At the outer side of the steel plate is provided a shaft 3. Said rotary drum 2 is encased in the main body 1 and the shaft 3 is journaled on a bearing 4 provided on the main body 1. One end of the rotary drum 2 is rotatably supported by a roll 5. The reference numeral 6 denotes a heating device such as a burner which is provided directly beneath the rotary drum 2; 7 a hot air supplying device provided outside the main body 1, its air inlet port 8 projecting further inside the rotary drum 2 than the open end of the drum for blowing the hot air into the rotary drum 2. The reference numeral 9 denotes a chimney fixed at the top of the main body 1; 10 a hopper for feeding the tea leaves; 11 a pulley for driving said shaft 3 by means of a motor which is not shown in the drawing; 12 plural vanes provided inside the rotary drum 2.

For producing the heat-treated tea according to the present invention using the drier as mentioned above, tea leaves are first fed into the rotary drum 2 via the hopper 10. The rotary drum 2 is heated at a temperature between 200° and 300° C. from underneath the rotary drum 2 using the heating device 6 while rotating the rotary drum 2 at a suitable angular velocity. At the same time, externally heated air (200°–300° C.) is blown into the rotary drum with tea leaves via the air inlet port 8.

The heat-treated tea of the present invention is brown-russet in color and can be served by brewing in the hot water as is done with other traditional green or roasted tea but has special flavor and aroma somewhat different from these conventionally processed teas.

Sugar and amino acid contained in the tea leaves react as the leaves are heated to produce highly reactive carbonyl compound (amino-carbonyl reaction). This compound further reacts with amino acid to change the leaves into brown and this reaction is said to bring out the aroma. The aroma of the heat-treated tea according to the present invention is also believed to derive from this reaction.

The heat-treated tea of the present invention has other useful pharmacological effects such as for disinfection and preventing hung-over and stiff shoulder. As it contains an ingredient which suppresses the mutation of cells, it is expected to be effective in preventing cancers and inhibiting the aging process.

It has not yet been elucidated which one of the ingredients is responsible for these pharmacological effects, but it is generally considered that synergestic actions of protein, amino acid, sugar, tannin, vitamins, cafein, chlorophyll, inorganic substances, and other trace elements as well as pharmacologically active substances produced by the complex chemical reactions of these ingredients are involved.

The so-called roasted tea of the prior art is produced by briefly treating the tea leaves with baked sand and the like at a temperature higher than 500° C., and such processing would not give rise to desirable chemical reactions of the ingredients observed in the present invention.

The extract of the heat-treated tea of the present invention can be added to wheat flour in making noodles. Noodles are made according to any conventional manner except that the extract of the heat-treated tea is added to the flour. That is, the extract is suitably diluted with water as necessary and added to the flour before rolling, kneading and cutting according to the conventional method. There is no specific limit to the amount of the extract addition: if firm texture is desired, the extract addition may be increased while for softer texture, the amount may be decreased. Although it may vary depending on the types of noodle, it is usually preferable to add about 10 to 200 g of the extract to 1 kg of the flour. As has been mentioned above, noodles can be manufactured without using salt if the extract of the heat-treated tea is added. However, this does not preclude the use of salt. Therefore, if salty noodles are desirable, a suitable amount of salt may be added together with said extract. Use of the extract results in noodles which do not crack or get out of shape during cooking but have firm and excellent texture. Generally, salt is added by 1 to 5% of the weight of the flour to prepare Japanese noodle or vermicelli in order to make it more glutinous by the action of glutein contained in the flour and to thereby prevent breaking of the noodles in dry state. Salt is thus an essential ingredient in noodle production and it is remarkable that noodles can be made without salt but by adding said extract. It should be noted that the extract of ordinary green tea has no such effects.

Use of the tea extract of the present invention in making breads and cakes would improve the yield as the amount of water absorption by the glutein in the flour increases. The flavor and texture of the product breads and cakes would also improve. Breads and cakes are made in the conventional manner except that the tea extract of the present invention is added.

The present invention will now be described in more detail referring to an example and a reference example.

EXAMPLE

One kg of green tea leaves is introduced into a tea drier provided with a heating device and an air supplying device to heat the tea leaves inside the drier to about 300° C. for 30 minutes by blowing dry air heated outside the drier to about 250° C. while heating the drier itself from the outside by means of a burner. Upon completion of heating, the tea leave are left for cooling to obtain the heat-treated tea.

REFERENCE EXAMPLE (1) Preparation of heat-treated tea extract

Two kg of the heat-treated tea as obtained in the example was boiled four times in 5.4 liters of water to obtain an extract of the heat-treated tea by combining the filterates.

(2) Preparation of noodles

Four kg of all-purpose flour, 480 g of the tea extract as obtained in the foregoing step (1) and 540 g of water were charged in a mixer for stirring and mixing. The mixture of raw materials was rolled using a primary machine and a compounder. The resultant sheet of noodle mixture was kneaded using a spreader before subjecting it to a roll for continuously cutting the same into strips. The cut noodle was dried to obtain 5 kg of dried noodle.

The resultant product is slightly brownish in color and has excellent and firm texture and taste. Analysis of the product revealed that its protein content and calory were greater than the conventional noodles containing salt.

(3) Preparation of buckwheat noodle

Four kg of a mixture containing wheat flour (7 parts in weight), buckwheat meal (3 parts in weight) and 860 g of the tea extract as obtained in the foregoing step (1) was charged in a mixer for stirring and mixing. The mixture of the raw materials was processed in the same manner as mentioned in the foregoing step (2) to obtain 5 kg of buck wheat noodle.

The resultant product was also firm in texture and excellent in taste.

(4) Preparation of loaf of bread

Seventy parts of flour, 2.5 parts of yeast and 50 parts of water were mixed in a blender for 3 minutes. The resultant dough was left standing for 4 hours and then added with 6 parts of sugar, 2 parts of salt, 6 parts of margarine, 0.01 parts of yeast food, 4 parts of skimmed milk, 35 parts of water and 20 parts of the tea extract as obtained in the foregoing step (1) and kneaded for 10 minutes using a blender. The dough was divided, raised for about 15 minutes, shaped and placed in a heater at 38° C. for about 40 minutes before baking at 200° C. to 210° C. for 30 minutes to obtain a loaf of bread. The product bread had a special aroma and crunchy texture. The bulk also increased by about 20% as compared with bread without the tea extract addition.

What is claimed is:

1. Heat treated tea produced by placing green tea leaves in a tea drier, supplying the drier with dry air externally heated to 200° and 300° C. and concurrently heating the drier from the outside of the drier at a temperature sufficient to heat the green tea leaves to 200° to 300° C. for 20 to 60 minutes.

2. A method for producing heat-treated tea comprising the steps of placing green tea leaves in a tea drier, supplying the drier with dry air externally heated to 200° to 300° C. and concurrently heating the drier from the outside of the drier at a temperature sufficient to heat the green tea leaves to about 200° to 300° C. for 20 to 60 minutes.

3. The method for producing heat-treated tea as claimed in claim 2 wherein said drier comprises a rotary drum encased in said drier and being rotatable therein, a heating device provided below said rotary drum, a hot air supplying device provided ouside the drier, and an air supply port connectd to said hot air supplying device and having an open end in communication with the inside of said rotary drum for supplying hot air therein.

4. The method for producing heat-treated tea as claimed in claim 3 wherein the temperature of said hot dry air passing into said rotary drum is 250° C. and the heating temperature of the drier is 300° C.

5. The method for producing heat-treated tea as claimed in claim 2 wherein the temperature of said hot dry air passing into said drier is 250° C. and the heating temperature of the drier is 300° C.

6. The method of claim 3 wherein said drier further comprises a rotatable shaft connected to an end of said rotating drum and means for rotating said shaft to thereby rotate said rotary drum.

7. The method of claim 6 wherein the rotatable shaft is journaled on a bearing provided on a side of said drier.

* * * * *